US009155052B2

United States Patent
Yanover et al.

(10) Patent No.: US 9,155,052 B2
(45) Date of Patent: Oct. 6, 2015

(54) ASSIGNING DYNAMIC GAIN FACTORS TO COORDINATE DISTRIBUTED RADIO UNITS

(71) Applicant: Alvarion Ltd., Tel Aviv (IL)

(72) Inventors: Vladimir Yanover, Kfar-Saba (IL); Tomer Goshen, Tel Aviv (IL); Rafi Zack, Kiryat-Ono (IL)

(73) Assignee: ALVARION Ltd., Tel Aviv (IL)

( * ) Notice: Subject to any disclaimer, the term of this patent is extended or adjusted under 35 U.S.C. 154(b) by 168 days.

(21) Appl. No.: 13/779,787

(22) Filed: Feb. 28, 2013

(65) Prior Publication Data

US 2014/0241185 A1 Aug. 28, 2014

(51) Int. Cl.
*H04W 52/24* (2009.01)
*H04W 52/14* (2009.01)

(52) U.S. Cl.
CPC .......... *H04W 52/243* (2013.01); *H04W 52/146* (2013.01); *H04W 52/242* (2013.01)

(58) Field of Classification Search
CPC . H04W 52/44; H04W 52/146; H04W 52/325; H04W 88/085
See application file for complete search history.

(56) References Cited

U.S. PATENT DOCUMENTS

| 2013/0005375 A1* | 1/2013 | Chen ............................. 455/509 |
| 2013/0029657 A1* | 1/2013 | Gao et al. ................... 455/422.1 |
| 2013/0237265 A1* | 9/2013 | Khojastepour et al. ....... 455/509 |

\* cited by examiner

*Primary Examiner* — Yong Zhou
(74) *Attorney, Agent, or Firm* — Pearl Cohen Zedek Latzer Baratz LLP

(57) ABSTRACT

A way of optimizing communication by minimizing the momentary overall radiated energy under constraints in respect to coverage and maintenance of communication with the users, is provided herein. Channel parameters are estimated from downlink and/or uplink communications or from user equipment messages and desirable gain factors are derived from the minimization. The optimization is reiterated continuously to dynamically adapt the communication system to varying conditions.

13 Claims, 6 Drawing Sheets

ASSIGNING DYNAMIC GAIN FACTORS TO COORDINATE DISTRIBUTED RADIO UNITS

BACKGROUND OF THE INVENTION

1. Technical Field

The present invention relates to the field of wireless communication, and more particularly, to a system architecture for management and coordination of multiple distributed remote radio units.

2. Discussion of Related Art

There is an ever growing need for faster communication with larger capacity, especially regarding cellular communication in crowded areas. One example is the distributed antennas system (DAS).

DAS system may be passive or active. Passive DAS uses passive components to distribute the RF signal. These passive components are coax cable, splitters, terminators, attenuators, circulators, couplers and filters (duplexer, diplexer or triplexer). Planning DAS includes calculating the maximum loss from base station to each antenna in the systems and the link budget for the particular area that each antenna covers. The passive DAS design needs to adapt to the limitation of the building regarding the restriction to where and how the heavy coax cable can be installed. A detail site survey of the building needed to be done to make sure that there are cable routes to all antennas.

Active DAS consists of a master unit (MU) connected to multiple expansion units (EU) with optical fiber up to 6 km in length. Each EU in turns connects to multiple remote units (RU) with thin coax or CAT5 cable up to 400 m in length. The MU controls and monitors the performance of the DAS. The UEs are distributed throughout the building and the RUs are installed close to the antenna. Active DAS has the ability to compensate for the losses of the cables interconnecting the components in the system by using internal calibrating signals and amplifiers. It does not matter what the distance between the antenna and the base station, all antennas in an active DAS will have the same performance (same noise figure and downlink power).

Both active and passive DAS suffer from several disadvantages. On the UL side the SNR is sensitivity limited due to the contribution of noise level from each RU reception signal. Furthermore, the brute force combining of all the RUs, could add interferences from RUs that don't receive any UE and "contribute" only interferers. On the DL side, the same signal is transmitted via all the RU's although it could contain irrelevant traffic for other spotted areas. That would cause DL interference for the macro deployment, neighbor small cells and redundant use of the radio resources. The DAS being RAN agnostic create a situation where the UL/DL signals couldn't be dynamically coordinated with respect to the RU. It would be agnostic to dynamic of the network traffic.

Another indoor solution is the small cell approach, deploying small IP-based cells as compact, standalone base stations with an integrated radio, baseband, and antenna unit. Base stations typically have integrated antennas, but sometimes antennas come separately. Femtocells can sit on desks, or mount on walls. Generally, picocells and femtocells connect to an IP Ethernet cable as backhaul or, in some cases, receive power over Ethernet. The small cell solution is based on deployment of Femto Access Points (FAP) or Pico cell that coordinated by SON management entity. The FAPs are connected to the Femto-GW via ethernet cables and the Femto-GW that concentrate all the FAPs is connected to the core network entities (SGSN and MCS). Small cells mainly come to provide capacity solution, but it has some challenges and limitations. Since it is most likely that the femto deployment would be in reuse, the system suffers from UL and DL interference between FAP's. Furthermore, the small cell deployment suffers from ping pong handovers due to the multitude of cells within a relevant small area. As a result it harms the QoE in mobility scenarios. Another disadvantage is the lack of effective utilization with regard to number of supported users, meaning that each small cell has a fixed maximum number of supported users (typically up to 32 active users) and as a result it could not support "hot zone" scenarios where many users are located near a single FAP.

There are systems which are using a coordinated small cell solution based on a local controller. The local controller unifies all small cells within each cluster and provides overall traffic aggregation and mobile session management for all services delivered through the cluster. Although it possess a coordination element the coordination inputs are limited to the information provided by L3 and the outputs are limited to the small cell flexibility, for instance it couldn't perform weight and combine, since this is a manipulation on the radio level.

BRIEF SUMMARY OF THE INVENTION

One aspect of the present invention provides a method of optimizing communication between an access unit and a plurality of user communication devices via a plurality of remote radio units. The method comprises the following stages: (i) defining a cost function as a momentary overall radiated energy, wherein the cost function is expressed in terms of gain factors of the access unit and the remote radio units, air channel parameters and physical channel energy; (ii) estimating the air channel parameters; (iii) setting constraints on the cost function with respect to coverage and maintenance of communication with the users, wherein the coverage constraint is defined using at least one common channel in the access unit and the communication maintenance constraint is defined using user communication device parameters; (iv) minimizing the cost function under the constraints, for at least one of: downlink communication in respect to the access unit and uplink communication in respect to the user communication devices; (v) calculating gain factors and implementing them in the access unit and the remote radio units according to the minimization of the cost function and the constraints; and (vi) reiterating the calculation and the implementation continuously.

These, additional, and/or other aspects and/or advantages of the present invention are: set forth in the detailed description which follows; possibly inferable from the detailed description; and/or learnable by practice of the present invention.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings.

DETAILED DESCRIPTION OF THE INVENTION

Figure 1:
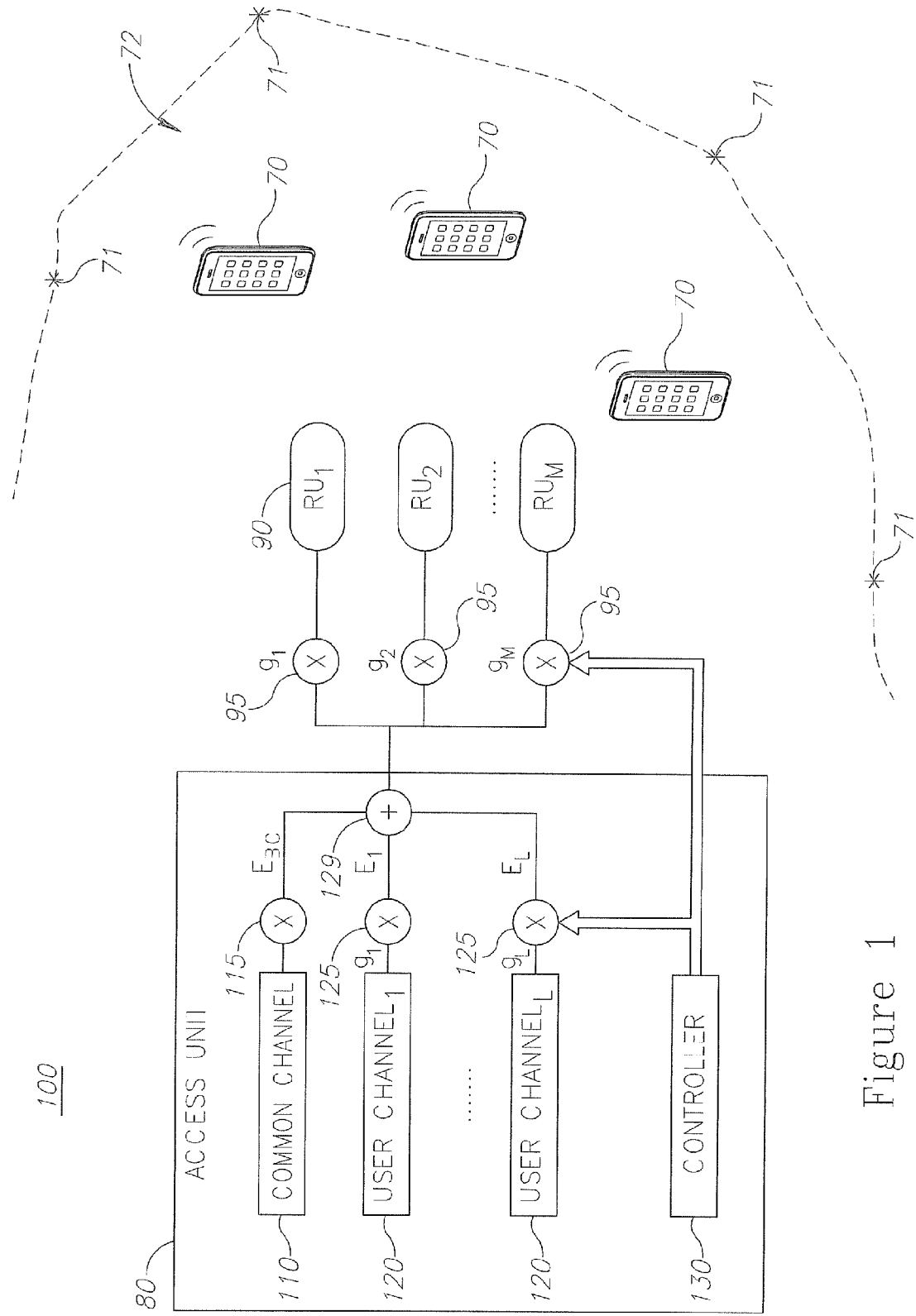
FIG. 1 is a high level schematic block diagram of a communication system, according to some embodiments of the invention.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

FIG. 1 is a high level schematic block diagram of a communication system 100, according to some embodiments of the invention.

Communication system 100 comprises an access unit 80 comprising at least one common channel 110 having a common channel gain factor 115, and a plurality of user channels 120 (including the Physical Downlink Shared Channel—PDSCH and the Physical Uplink Shared Channel—PUSCH), each associated with a user communication device (UE) 70 and having a user channel gain factor 125. Access unit 80 communicates with user communication devices (UEs) 70 via a plurality of remote radio units (RUs) 90, each having a RU gain factor 95. In the current application, user channels 120 are marked from 1 to L (for L UEs) and remote radio units (RUs) 90 are marked 1 to M (for M RUs).

Some of the methods and concepts disclosed herein for downlink communication are applicable with the necessary changes to uplink communication and vice versa.

In the present invention, one to several channels are grouped and referred together by the term common channel 110 (referred to with the index BC in the following mathematical treatment, standing for "broadcasting channel" as one of the possible embodiments of the common channel, but not limited thereto), namely for example, in LTE standard, PDCCH, RS, PSS, SSS, PCFICH, PBCH and PHICH channels, or any downlink commonly used channels may be referred to jointly as common channel 110. It is assumed that common channel 110 has Energy Per Resource Element (EPRE) identical to that of the RS. In real systems the PDCCH can be boosted over RS, but not significantly, so this assumption is reasonable for the PDCCH. Other components of common channel 110 together occupy a small fraction of total time-frequency resources which justifies the above assumption.

In a non-limiting example, user channels 120 are combined in combiner 129 upon exiting access unit and then distributed to RUs 90. As a result, system 100 handles two vectors of gain factors (L gain factors 125 and M gain factors 95). In embodiments, user channels 120 may be allocated in a more complex manner to allow associating any user channel 120 with any RU 90, resulting in a matrix (1 ... L, 1 ... M) of coefficients that may be adjusted by a similar procedure as the one presented here for the two gain factor vectors.

Communication system 100 further comprises at least one controller 130 arranged to receive communication related data and adjust the common channel, PDSCH and RU gain factors, 115, 125 and 95 respectively, according to method 200 and algorithm presented below.

As general outlines, controller 130 is configured to: (i) define a cost function as a momentary overall radiated energy, wherein the cost function is expressed in terms of gain factors 115, 125 of access unit 80 and 95 of remote radio units 90 (also termed remote units or RUs), air channel parameters such as path losses and interference noise and physical channel energy; (ii) estimate the air channel parameters, e.g. from uplink or downlink signals or from user equipment messages; (iii) set constraints on the cost function with respect to coverage and maintenance of communication with the users, wherein the coverage constraint is defined using common channel 110 in access unit 80 and the communication maintenance constraint is defined using user communication device parameters; (iv) minimize the cost function under the constraints, for downlink communication in respect to access unit 80, and/or for uplink communication in respect to user communication devices 70; (v) calculate gain factors and implement them in access unit 80 and remote radio units 90 according to the minimization of the cost function; and (vi) reiterate the calculation and the implementation continuously.

Before outlining the method in detail, the following annotations are explained.

The index u is used for numbering of UEs 70, $1 \leq u \leq L$, the range $L+1 \leq u \leq L+K$ corresponds to points 71 in the area 72 (normally most distant from RUs 90) where the coverage should be provided for common channel 110; these points are not associated with any particular UE 70.

$\rho_u^A$, $\rho_u^B$—DL Power Allocation parameters per $UE_u$ as specified in 3GPP TS36.213 section 5.2

$E_u$—EPRE of PDSCH transmissions to $UE_u$ under $\rho_A$, $E_u = E_{BC} \cdot \rho_u^A$ −6 dB$\leq \rho_u^A \leq$3 dB $E_u^B$—EPRE of PDSCH transmissions to $UE_u$ under $\rho_B$, 3GPP 36.213 section 5.2; $E_u^B = E_{BC} \cdot \rho_u^B = E_u \cdot \Delta$, where $\Delta = \rho_B/\rho_A$ is a cell level parameter; $0.4 \leq \Delta \leq 1$ BW—channel width, in units of REs i.e. in units of subcarriers I and N—EPRE of other-cells interference and noise; assumed constant over time. Includes also interference margin and slow fading margin;

$IN_u$ denotes the value of I+N at the location of UEu ($1 \leq u \leq L$) or distant reference points in the area ($L+1 \leq u \leq L+K$)

$MCS_u$—(constant) MCS of the PDSCH transmissions to $UE_u$.

$\gamma_{BC}$—SINR required for proper functioning of all channels in the common channel group.

$\gamma(MCS_u)$—minimal SINR that provides for required BER in PDSCH transmissions to the $UE_u$.

For a time interval T, within the time-frequency domain T×BW the following are shares of particular DL allocations (input parameters):

allocations for common channel 110: $m_{BC} \cdot (T \cdot BW)$
allocations with no transmission (zero energy): $m_0 \cdot (T \cdot BW)$
allocations for the UEu where the $\rho_A$ is used $m_u^A \cdot (T \cdot BW)$
  $m_u^A = q \cdot m_u$ where q=5/7;
allocations for the UEu where the $\rho_B$ is used; $m_u^B \cdot (T \cdot BW)$
  where $m_u^A = (1-q) \cdot m_u$.

Overall, $$m_{BC} + m_0 + \sum_{u=1}^{L}(m_u^A + m_u^B) = m_{BC} + m_0 + \sum_{u=1}^{L} m_u = 1,$$

where:
$g_a$ is the gain value of the $RU_a$, $1 \le a \le M$; normalized as $$\max_{1 \le a \le M} g_a = 1,$$

and
$E_{max}$ is the maximum allowed transmit power for the antenna.
$E_{BC}$, $E_u$, $g_a$ are the unknowns that are calculated by the algorithm below.

Figure 2:
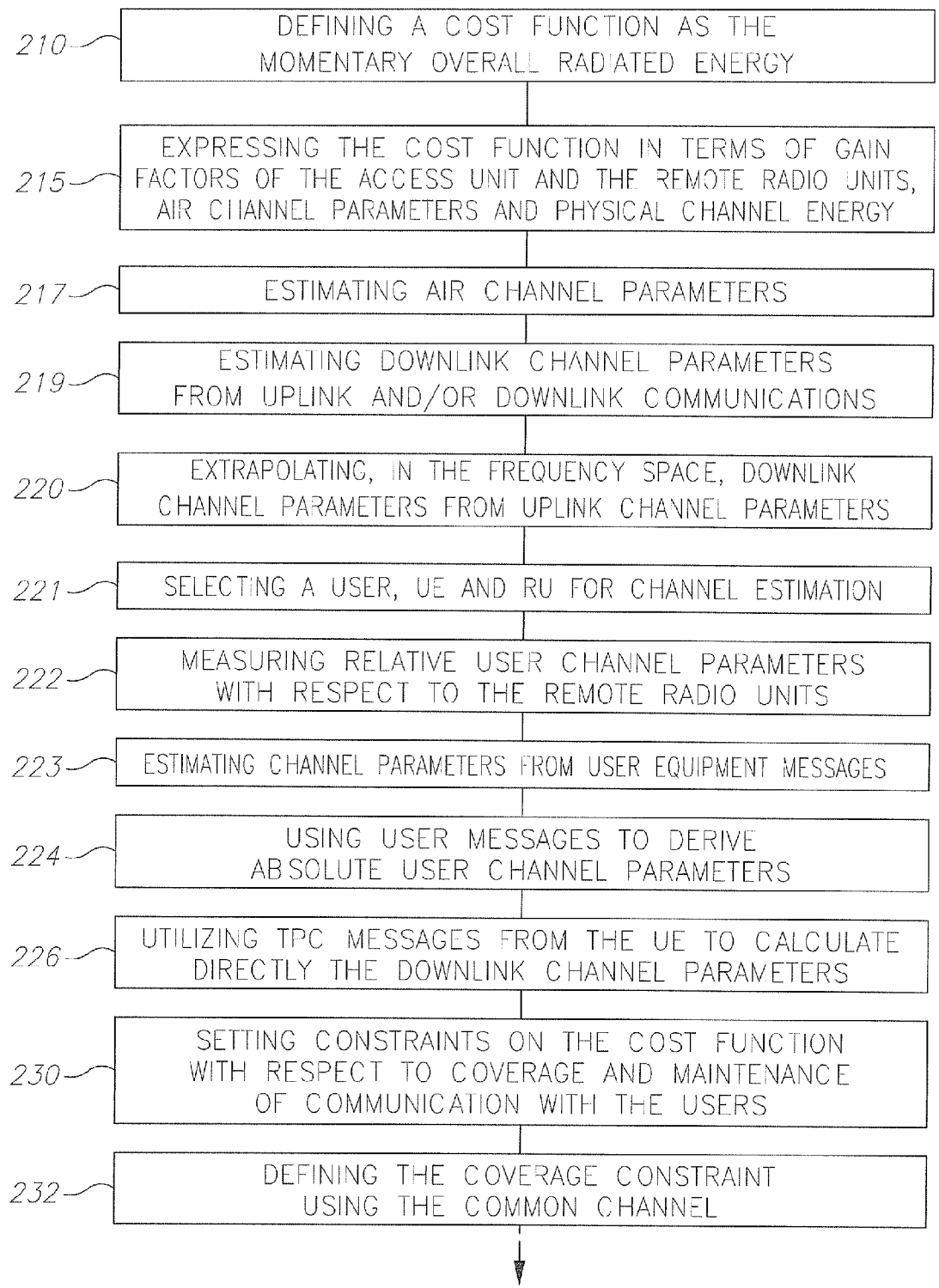
FIG. 2 is a high level flowchart illustrating a method of optimizing communication, according to some embodiments of the invention.
Figure 2:
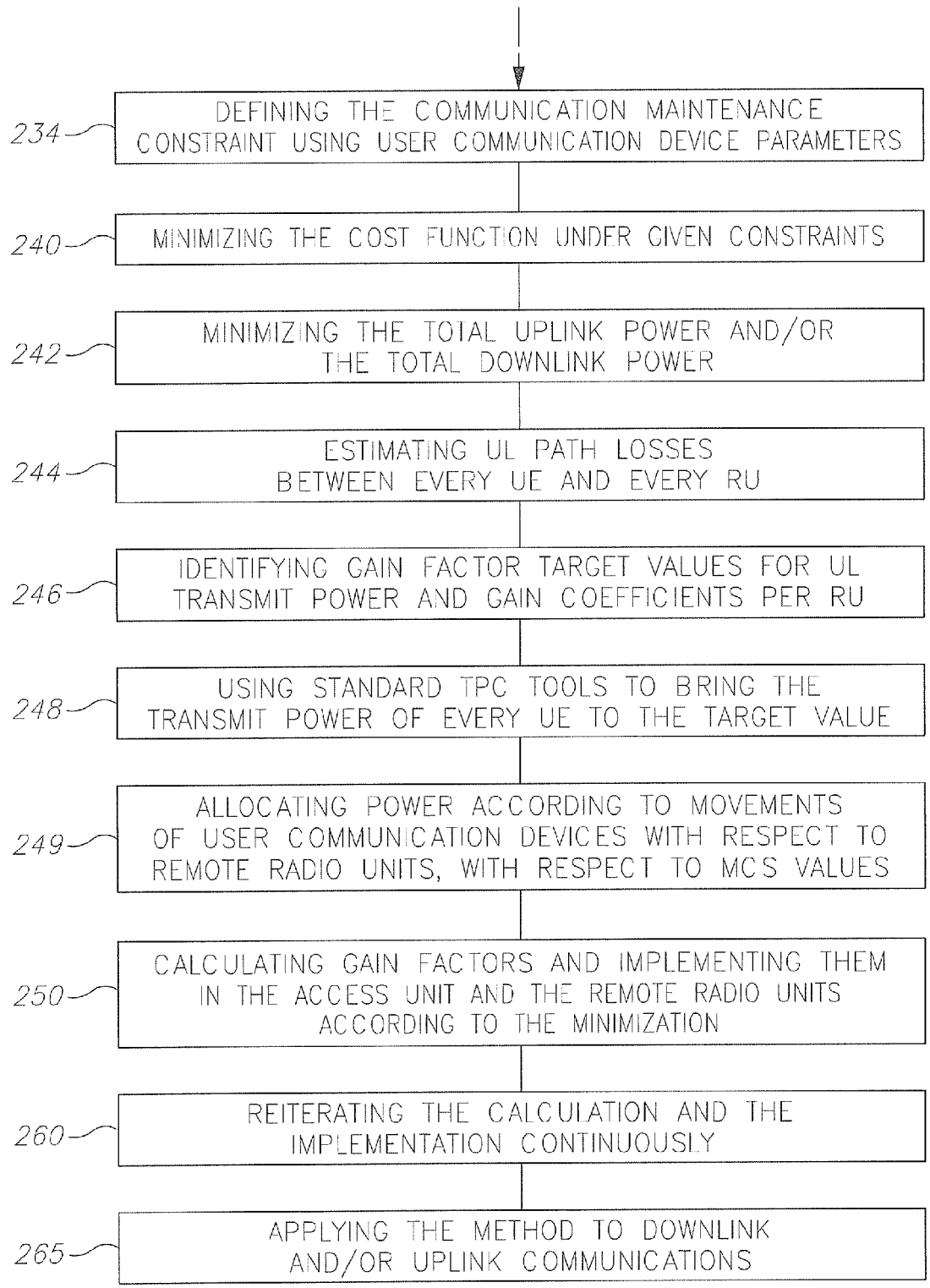

FIG. 2 is a high level flowchart illustrating a method 200 of optimizing communication, according to some embodiments of the invention. Method 200 optimizes communication between an access unit and a plurality of user communication devices (UEs) via a plurality of remote radio units (RUs). Method 200 comprises the following stages.

First, method 200 comprises defining a cost function as a momentary overall radiated energy (stage 210). For example, the momentary overall radiated energy may be of the remote radio units in downlink and the user equipments' communication in uplink. In embodiments, method 200 further comprises expressing the cost function in terms of gain factors 125 of access unit 80 and gain factors 95 of remote radio units 90, air channel parameters such as path losses and interference noise and physical channel energy (stage 215), as well as estimating the air channel parameters (stage 217).

For example, the cost function may be expressed as the sum of power levels transmitted by the RUs over the whole bandwidth, averaged over time, namely:

$$E_{total} = \left(\sum_a g_a\right) \cdot BW \cdot \left[m_{BC} \cdot E_{BC} + (q + (1-q) \cdot \Delta) \sum_{u=1}^{L} m_u \cdot E_u\right]$$

Wherein:
$E_{total}$ is the overall power,
$g_a$s are the antenna gain factors 95 of each RU 90 (1 ... m),
BW is the transmission bandwidth,
$m_{BC}$ is defined above,
$E_{BC}$ is the power of common channel 110 in access unit 80 as defined above,
q is 5/7 as defined above,
$\Delta$ is $\rho_B/\rho_A$, a cell level parameter (see above),
The expression $(q+(1-q)\cdot\Delta)$ is the relative allocation to user channels 120,
$m_u$s are the gain factors 125 of user channels 120 (PDSCH) (1 ... L) in access unit 80,
$E_u$s are the power of user channels 120 (PDSCH) (1 ... L) in access unit 80.

Then, method 200 comprises setting constraints on the cost function with respect to coverage and maintenance of communication with the users (stage 230) and minimizing the cost function under the constraints, for the downlink in respect to the access unit and/or for the uplink in respect to the user communication devices (stage 240).

For example, constraints may comprise: (i) coverage of a specified coverage area 72 as defined by virtual coverage boundaries 71, with a minimal signal to noise ratio (SNR) or minimal signal to interference and noise ratio (SINR), and (ii) providing a specified minimal service level to user communication devices 70, as defined e.g. by user communication device parameters (stage 234) such as the UE's modulation and coding scheme (MCS).

Method 200 may comprise defining the coverage constraint using the common BC channel 110 (stage 232).

The first constraint (i) may be expressed mathematically as:

$$\sum_a \frac{g_a \cdot E_{BC}}{PL_{a,u} \cdot IN_u} \ge \gamma_{BC}$$

being the coverage constraint for virtual coverage boundaries 71 expressed as shared channels (PDSCH) 120 beyond the L allocated channels (L+1 ≤ u ≤ L+K, with K being the number of virtual UEs 71), wherein:
$g_a$'s are the antenna gain factors 95 of each RU 90 (1 ... m), wherein $\max_{1 \le \alpha \le M} g_\alpha = 1$ and $0 \le g_\alpha \le 1$ with respect to the M remote radio units 90,
$E_{BC}$ is the power of common channel 110 in access unit 80 as defined above,
$PL_{a,u}$ are the path losses of the channels to virtual $UE_u$ 71 via antenna "a",
$IN_u$ is the interference coefficient with respect to virtual $UE_u$ 71,
$\gamma_{BC}$ is the minimum SINR required for proper functioning of all channels in the BC group by the virtual $UE_u$ 71.

The second constraint (ii) may be expressed mathematically as:

$$\sum_a \frac{\Delta \cdot g_a \cdot E_u}{PL_{a,u} \cdot IN_u} \ge \gamma(MCS_u)$$

being the minimal service constraint for mobile communication devices $UE_u$ 70 $1 \le u \le L+K$, wherein:
$\Delta$ is between 0.4 and 1 (see above), $\Delta$ may be replaced with 1 for the $\rho_A$ region
$g_a$s are the antenna gain factors 95 of each RU 90 (1 ... m), wherein $\max_{1 \le \alpha \le M} g_\alpha = 1$ and $0 \le g_\alpha \le 1$ with respect to the M remote radio units 90,
$E_u$s are the power of user channels 120 (PDSCH) (1 ... L) in access unit 80,
$PL_{a,u}$ are the path losses of the channels to $UE_u$ 70 via antenna "a",
$IN_u$ is the interference coefficient with respect to $UE_u$ 70,
$\gamma(MCS_u)$—is the minimal SINR that provides for required BER in PDSCH transmissions to the UEu 70.

Figure 3A:
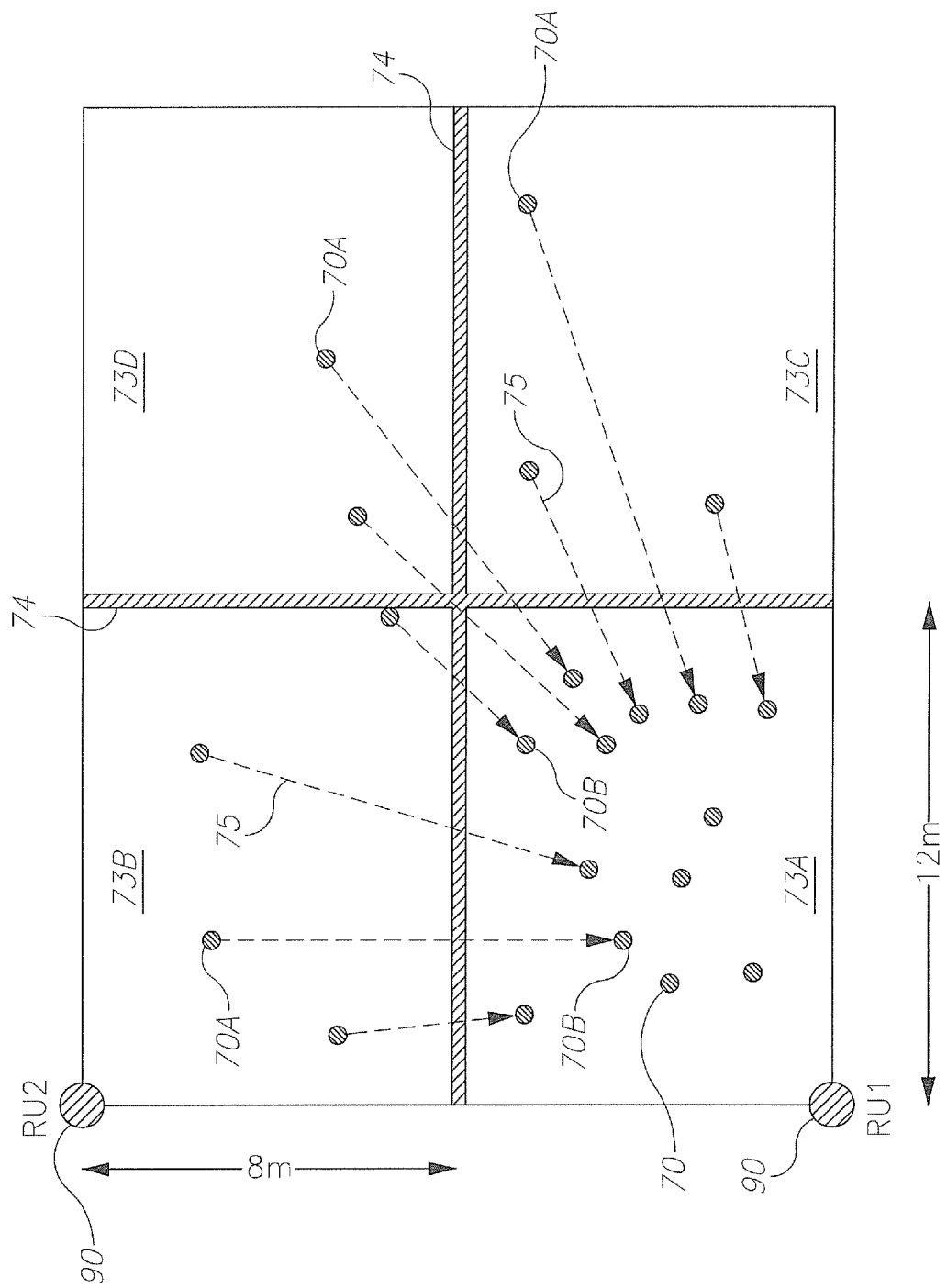
FIGS. 3A-3C illustrate a user scenario and simulation results associated therewith, according to some embodiments of the invention.
Figure 3B:
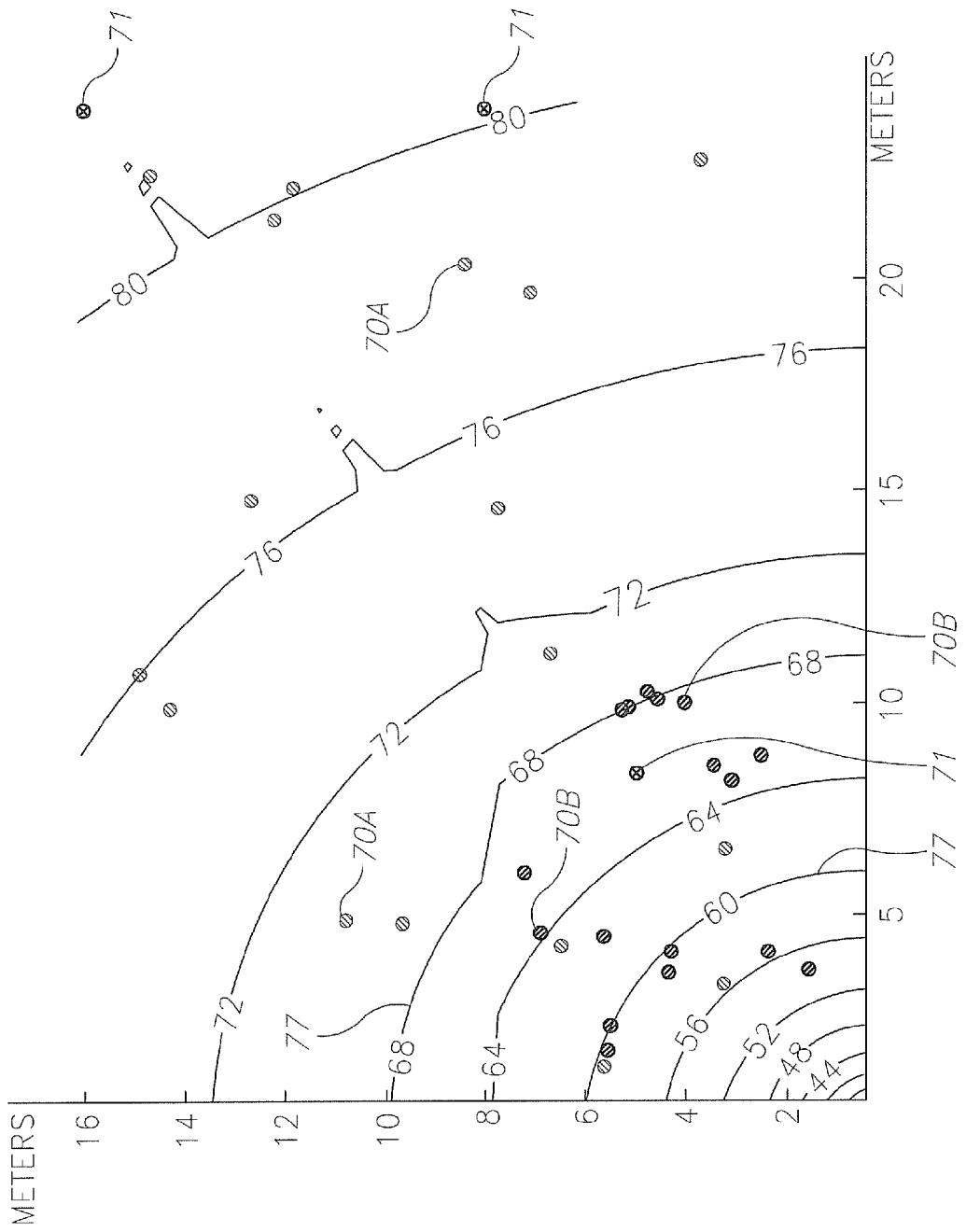
Figure 3C:
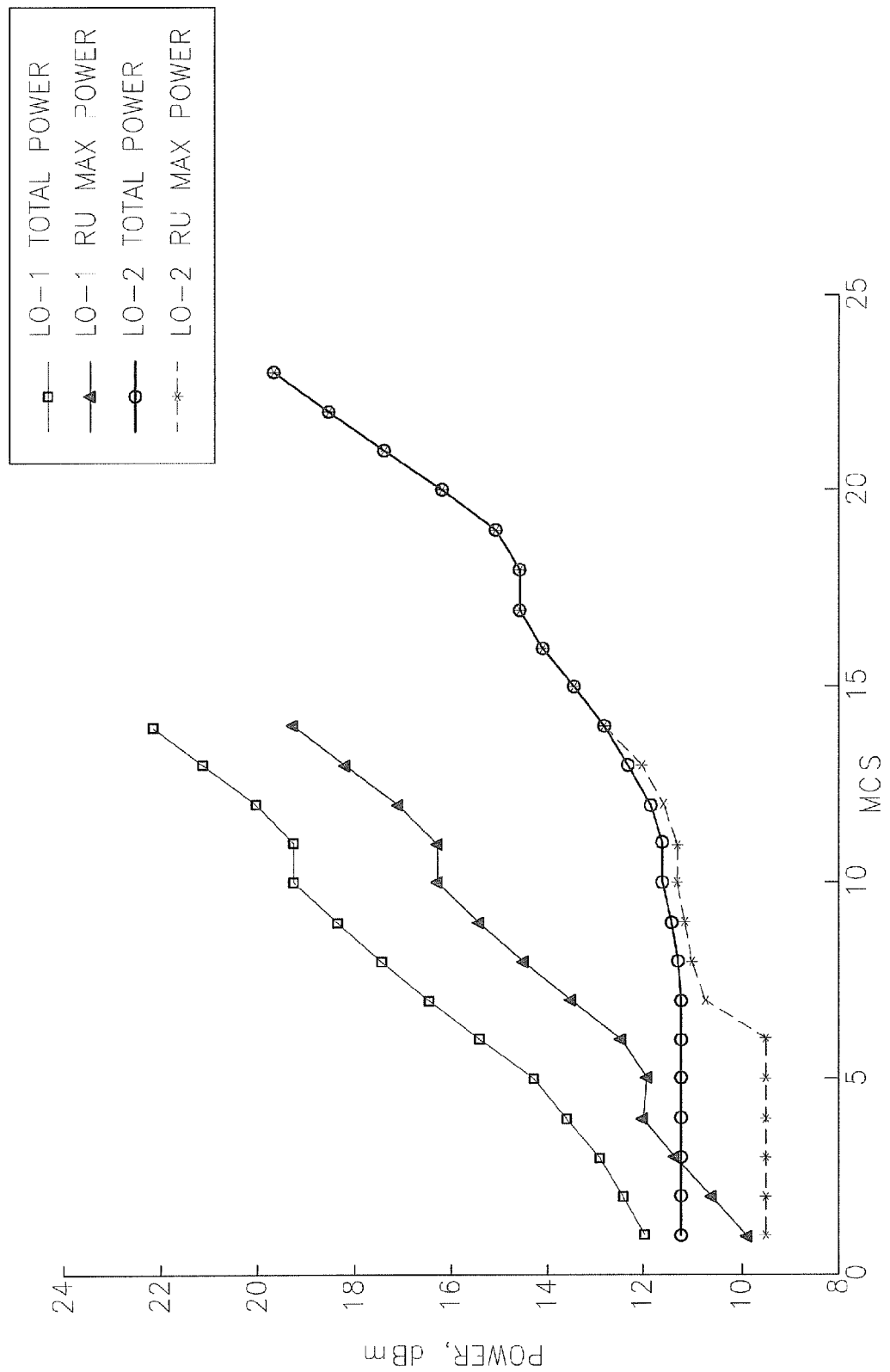

For example, FIGS. 3A-3C illustrate a user scenario and simulation results associated therewith, according to some embodiments of the invention. FIG. 3A illustrates a scenario in which twenty UE's 70 are initially uniformly spread over four rooms 73A-73D which are separated by light walls 74 (Layout 1, with the UEs marked 70A). The users from rooms 73B-73D then move (75) and concentrate with their UE's 70 in room 73A, still uniformly spread (Layout 2, with the UEs marked 70B). UEs 70 are serviced by two RUs 90. The optimization algorithm is used to set power levels for BC as common channel 110 and PDSCH.

PDSCH allocations for the $UE_u$ 70 appear with granularity of RB therefore always include REs that belong to both areas 73A and 73B. For $1 \leq u \leq L$, $$\delta_1 \leq \frac{E_u}{E_{BC}} \leq \delta_2,$$

where $\delta_1 = 10^{-0.6}$ and $\delta_2 = 10^{0.3}$ according to the available range of $\rho_A$.

The mathematical expressions for the constraints (i) and (ii) presented above may be transformed to the form: $E_{BC} \geq G_{BC}(g)$ and $E_u \geq H_u(g)$, where:

$$G_{BC}(g) = \max_{L+1 \leq u \leq L+K} \frac{\gamma_{BC}}{\sum_a \frac{g_a}{Q_{a,u}}} \quad Q_{a,u} = PL_{a,u} \cdot IN_u$$

$$H_u(g) = \frac{\gamma(MCS_u)}{\Delta \cdot \sum_a \frac{g_a}{Q_{a,u}}} \quad (1 \leq u \leq L).$$

Considering $g_a$ to be constant, the solution for the minimization of the cost function given the constraints is:

$$E_{BC} = E_{BC}^0(g) = \max\left\{GBC(g), \max_{1 \leq u \leq L} \frac{H_u(g)}{\delta_2}\right\}$$

$$E_u = E_u^0(g) = \max\{H_u(g), \delta_1 \cdot E_{BC}^0(g)\}$$

Imposing the additional restriction (note that $\max g_\alpha = 1$):

$$\left(\max_{1 \leq a \leq M} g_a\right) \cdot BW \cdot \left[m_{BC} \cdot E_{BC} + (q + (1-q) \cdot \Delta) \sum_{u=1}^{L} m_u \cdot E_u\right] \leq E_{max},$$

the minimal value of $E_{total}$ as a function of g can be expressed using:

$$\Phi(g) = \min_{E_{BC}, E_u} E_{total}(E_{BC}, E_u, g), \text{ as:}$$

$$\Phi(g) = \left(\sum_a g_a\right) \cdot BW \cdot \left[m_{BC} \cdot E_{BC}^0(g) + (q + (1-q) \cdot \Delta) \sum_{u=1}^{L} m_u \cdot E_u^0(g)\right]$$

So the problem is reduced to minimization of $\Phi(g)$ in the region $$\max_{1 \leq a \leq M} g_a = 1 \text{ and } 0 \leq g_a \leq 1$$

Method 200 may comprise estimating of downlink path losses from uplink and/or downlink communications (stage 219) and/or from user equipment messages (stage 223). Two main parameters that must be estimated in order to minimize the cost function are $PL_{a,u}$ (the path losses of the channels to $UE_u$ 70 via antenna "a") and $IN_u$ (the interference coefficient with respect to $UE_u$ 70).

In embodiments, the present invention comprises a method of estimating air channel parameters, comprising: (i) selecting a user from a plurality of users, a user mobile communication device from a plurality of user mobile communication devices and a remote radio unit from a plurality of remote radio units (stage 221); estimating relative user channel parameters with respect to the other remote radio units (stage 222); and using user messages to derive absolute user channel parameters (stage 224), wherein at least one of the selecting, the estimating and the using is carried out by a computer processor. The method may further comprise measuring path losses for pairs of user communication devices and remote radio units utilizing at least one of: Reference Signal Received Power (RSRP) messages and Reference Signal Received Quality (RSRQ) messages and utilizing transmission power control (TPC) messages from the user communication devices to calculate directly path losses as the downlink channel parameters.

The following derivations illustrate two options for estimating path losses, using which the cost function may be minimized and the gain factors derived. One option, illustrated in example 1, calculates path losses based on communication of access unit 80 with UEs 70, while the second option, illustrated in example 2, calculates path losses based on measurements by UEs 70.

Example 1

Calculating Path Losses Based on Communication of the Access Unit with the UEs

In embodiments, estimating path losses from uplink communications (stage 219) comprises extrapolating, in the frequency space, downlink channel parameters from uplink channel parameters or vice versa (stage 220), selecting a user, a user mobile communication device and a remote radio unit for channel estimation (stage 221) measuring relative user channel parameters with respect to the remote radio units (stage 222) and using user messages to derive absolute user channel parameters (stage 224). This approach assumes that the path loss in the DL can be estimated based on UL path loss with some degradation that depends on the DL/UL frequency separation. The UL path loss measurement includes that the eNB 80 switches the UL measurement path to particular RU 90, initiates certain transmission by the UE 70 and performs measurements of the received signal, as explained below.

Estimating path losses from uplink communications (stage 219) extrapolates in the frequency space the downlink path losses from the uplink path losses. First, stage 219 comprises measuring relative factors $a_1 \ldots a_M$ which quantify the relative path loss of a specific UE 70 with respect to each of RUs 90, by quickly toggling between RUs 90 with respect to a user reference symbol. Stage 219 utilizes user messages (stage 223) regarding the received downlink signal at UE 70 (e.g. RSRP relating to signal strength) from which the path losses can be calculated using the measured relative factors $a_1 \ldots a_M$. A similar calculation may be carried out of estimate the interference factors using user messages such as RSRQ relating to interference, that allow estimating the effective SINR. These estimations (stage 219) are presented in detail below.

Prior to the path loss estimation, during the RRC connection (re)configuration, the eNB transfers to the UE 70 the following parameters described in 36.213 (3GPP TS 36.213 V10.1.0 (2011-03) Physical layer procedures), Section 5.1.1.1: $\eta_c^{(i)}, P_{O\_PUSCH,c}(j), \alpha_c(j)$. The values of these parameters are selected based on regular policy of access unit 80, e.g. as an eNB.

It is assumed that, according to 36.213 section5.1.1.1 "UE behavior", $P_{PUSCH,c}(i)=\min\{P_{CMAX,c}(i), P_{req}(i)\}$ where $P_{req}(i) = 10 \log_{10}(M_{PUSCH,c}(i)) + P_{O\_PUSCH,c}(j) + \alpha_c(j) \cdot PL_c + \Delta_{TF,c}(i) + \eta_c(i)$ The following procedure should be applied every time when the path loss values need to be updated; all steps performed by the eNB 80 on per RU 90 basis.

The eNB 80 configures Headroom reports. The Headroom reports can be configured as triggered by periodic PHR-Timer. In this case, if the next report is expected soon enough, the eNB 80 just waits until expiration of the timer and allocates necessary resource in the UL for the UE 70. Another possibility is to trigger the report immediately by the following: the eNB 80 disables and then enables again the power headroom reporting functionality at the UE 70. The eNB 80 allocates necessary resource in the UL for the UE 70.

To measure the path loss for particular pair {RU 90, UE 70}, the eNB 80 switches the UL measurement path to the RU 90 and triggers the following pre-configured reports RSRP (higher layer filtered RSRP=Reference Signal Received Power) and RSRQ (Reference Signal Received Quality). RSRP is defined as the linear average over the power contributions of the resource elements that carry cell specific reference signals within the considered measurement frequency bandwidth. According to 36.214, 5.1.3, Reference Signal Received Quality (RSRQ) is defined as the ratio K×RSRP/(E-UTRA carrier RSSI), where K is the number of RB's of the E-UTRA carrier RSSI measurement bandwidth. The measurements in the numerator and denominator shall be made over the same set of resource blocks. The RSSI value is the (properly time averaged) total received power (in [W]) observed only in OFDM symbols containing reference symbols for antenna port 0, in the measurement bandwidth, over the number K of resource blocks by the UE 70. This power is coming from all sources, including co-channel serving and non-serving cells, adjacent channel interference, thermal noise etc. If higher-layer signaling indicates certain subframes for performing RSRQ measurements, then RSSI is measured over all OFDM symbols in the indicated subframes.

When the UE 70 reports the RSRP and RSRQ values on the PUSCH, the eNB 80 measures the total energy ERx (over $M_{PUSCH,c}(i)$) received from the UE 70. The eNB 80 calculates the PLc according to the reported value of the RSRP as ratio referenceSignalPower/RSRP. See 36.331→6.3.2 for details about referenceSignalPower. Then the eNB 80 calculates the transmit power ETx over $M_{PUSCH,c}(i)$). The reported RSRP value is for the sum of signals received from all RUs 90, so the achieved value of PLc is not really the DL path loss between (any) antenna and the UE. However it is exactly the value used by the UE 70 in the formula for the transmit power. The eNB 80 computes the UL path loss between the UE 70 and the RU 90 as $PL_{UL,c}$=ETx−ERx. For the I+N, the eNB 80 computes the carrier RSSI per RB, based on the reported RSRQ value. According to 36.214, 5.1.3, RSRQ is defined as K×RSRP/(E-UTRA carrier RSSI), where K is the number of RB's of the E-UTRA carrier RSSI measurement bandwidth. The received energy per RB at the UE 70 is therefore ERxRB=RSRQ/K. On the other hand, $$ERx_{RB} = \sum_a g_a \frac{ETx_{RB}}{PL_{a,u}} + (I+N)_{RB},$$

where:
ETxRB=the total energy transmitted by the BBU within the RB, $(I+N)_{RB}$=the total energy of I+N within the RB.
Therefore the I+N per RB can be computed as $$(I+N)_{RB} = \frac{RSRQ}{K} - \sum_a g_a \frac{ETx_{RB}}{PL_{a,u}},$$

from which the I+N over the whole bandwidth can be computed.

Example 2

Calculating Path Losses from Measurements by the UEs

The other option to estimate the path losses is from user equipment messages (stage 223), as an approach that avoids downlink channel parameters extrapolation from the uplink channel (stage 221) may utilize transmission power control (TPC) messages from UE 70 to calculate directly the downlink channel parameters such as path losses and interference (stage 226). The estimation comprises the following stages. The estimation is carried out by a calculation of the I+N power density at the location of every UE 70. This parameter is estimated based on the RSRQ reports from the UE 70.

In these K RBs=12K REs, within a symbol duration interval that includes in average KRS RS REs, other REs can be occupied by broadcast channel(s) such as PHICH, PBCH, PDCCH, PCCH total in average $K_{BC}$×RE or by Shared Channel (PDSCH) 120—average $K_{SCH}$×RE. As a result, $12K=K_{RS}+K_{BC}+K_{SCH}$. Note that $K_{BC}$ and $K_{SCH}$ are not necessarily integers. Hence:

$$RSRQ = \frac{K_{RS} \cdot RSRP}{K_{RS} \cdot RSRP + K_{BC} \cdot EPRE_{BC} + K_{SCH} \cdot EPRE_{SCH} + K \cdot EPRE_{I+N}}$$

where all parameters are measured at the UE receiver 70, and:
$EPRE_{BC}$=EPRE of the broadcast channels over the measurement bandwidth (assuming same value [to be clarified] for PHICH, PBCH, PDCCH, PCH),
$EPRE_{SCH}$=average EPRE of the shared channel over the measurement bandwidth; this value accommodates the per-UE $\rho_A$ values,
$EPRE_{I+N}$=EPRE of the interference+noise measured over the measurement bandwidth.
The expression for RSRQ may be modified to:

$$RSRQ = \frac{K_{RS}}{K_{RS} + K_{BC} \cdot \frac{EPRE_{BC}}{RSRP} + K_{SCH} \cdot \frac{EPRE_{SCH}}{RSRP} + K \cdot \frac{EPRE_{I+N}}{RSRP}}$$

In this form of expression, the following ratios are equal to the corresponding values measured at the transmitter i.e. at the antenna port of the eNB 80:

$$\frac{EPRE_{BC}}{RSRP}, \frac{EPRE_{SCH}}{RSRP},$$

therefore the value $$\frac{EPRE_{I+N}}{RSRP}$$

can be derived from the RSRQ measurements and the above expressions. Note that the RSRP is also known from the reports of the UE 70.

To summarize, the inputs are: $K_{RS}$, $K_{BC}$, $K_{SCH}$; RSRQ measured at the transmitting antenna of the eNB 80, and $EPRE_{BC}$/RSRP and $EPRE_{SCH}$/RSRP at the transmitting antenna of the eNB 80. The outputs are: $EPRE_{I+N}$ measured at the UE receiver 70.

Assuming that the DL and UL path loss are identical, they may be denoted by $PL_{a,u}$=the path loss between the $RU_a$ and the $UE_u$. The EPRE of the $UE_u$ transmission as measured at the eNB 80 through the $RU_a$ 90 using the measurement channel is:

$$ULRX\_EPRE_{a,u} = \frac{ULTX\_EPRE_u}{PL_{a,u}}$$

where $ULTX\_EPRE_u$=transmit power density of the $UE_u$ 90 at certain channel e.g. at certain RE 90 of the PUSCH.

Assuming that $PL_{a,u}$ do not change between measurements performed over different RUs 90, the ratios $$\lambda_{a,u} = \frac{ULRX\_EPRE_{a,u}}{ULRX\_EPRE_{a,1}} = \frac{PL_{a,1}}{PL_{a,u}}$$

can be calculated by the eNB 80; then $$PL_{a,u} = \frac{PL_{a,1}}{\lambda_{a,u}}.$$

For the DL RS transmission, the RSRP value at the $UE_u$ will be equal to $$RSRP_u = EPRE_{RS} \cdot \sum_a \frac{g_a}{PL_{a,u}},$$

Where $EPRE_{RS}$=the EPRE of the RS measured at the transmitter i.e. at the eNB antenna port; and $g_a$=gain of the $RU_a$ 90.

In another form (with u being arbitrary):

$$RSRP_u = \frac{EPRE_{RS}}{PL_{a,1}} \cdot \sum_a \lambda_{a,u} \cdot g_a$$

All parameters at both sides of this equation, except $PL_{a,1}$, are known; therefore $PL_{a,1}$ can be calculated from the equation and then, using $$PL_{a,u} = \frac{PL_{a,1}}{\lambda_{a,u}},$$

all $PL_{a,u}$ can be derived from $PL_{a,1}$.

To summarize, the inputs are: $ULRX\_EPRE_{a,u}$(for all a, u), $EPRE_{RS}$=the EPRE of the RS measured at the transmitter i.e. at every eNB antenna ports, $RSRP_u$=RSRP value measured at certain $UE_u$; one or several values of u can be used, and $g_a$, the outputs are the $PL_{a,u}$.

According to the above explained algorithm, method 200 may comprise calculating desirable gain factors ($g_a$'s) and implementing them in the access unit and the remote radio units according to the minimization of the cost function (stage 250), and reiterating the calculation and the implementation continuously (stage 260) to optimize communication. Method 200 may be applied to downlink and/or uplink communications (stage 265).

FIG. 3B illustrates simulation results as the path losses of UE's 70 with respect to RU1 as a function of their positions. FIG. 3B presents lines 77 of equal path loss (in dB down, i.e. the signal path loss from RU1) with respect to RU1 with respect to the scenario presented in FIG. 3A, denoting the positions of UE's 70A in Layout 1 (areas 73A-D in FIG. 3A) and the positions of UE's 70B in Layout 2 (area 73A in FIG. 3A), as well as positions of points 71 that denote the required coverage range for common channel 110 with respect to both RUs (these points are not associated with any particular UE 70).

FIG. 3C illustrates simulation results as the maximum between the power of the RU's 90 (max(RU1, RU2)) with respect to the total power (RU1+RU2). MCS denotes the MCS used by all UEs in the PDSCH, LO-1 and 2 denote Layout 1 (areas 7A-D in FIG. 3A) and Layout 2 (area 73A in FIG. 3A), respectively, Total power denotes the total power of all RUs in the respective layout.

While in Layout 1, with UEs 70A spread, the total power is larger than the maximal power of any single RU (i.e. both RUs operate at high power), in Layout 2 the RU with maximal power is very close to the total power of the RUs, meaning that power is saved in the other RU. This is especially pronounced in the higher MCS, as low MCS are still used for common channel 110 in both RUs.

The outcome of the simulation is the total transmit power as function of MCS at the PDSCH. The simulation shows that for LO-1 the common channel (RS) is powered over the minimum needed to provide necessary SINR because of restriction (EPRE of PDSCH)−(EPRE of RS)≤3 dB imposed by the range of possible values of $\rho_A$. In the considered configuration, the algorithm provides for approximately 5.5 dB gain comparatively to the system where the gains of the RUs are set statically and uniformly (prior art "DAS reference").

Method 200 may further comprise allocating power (e.g. remote radio unit downlink power and/or user mobile communication device uplink power) according to spatial movements of user communication devices with respect to remote radio units, with respect to MCS values (stage 249). The following illustrates an example of a downlink power allocation termed "Proportional Fair Power Allocation algorithm". In "A Proportional-Fair Power Allocation Scheme for Fair and Efficient Multiuser" OFDM Systems Hanbyul Seo and Byeong Gi Lee, School of Electrical Engineering, Seoul National University. Globecom 2004, p.3741-3747, the following function is used to select the next UE to be granted additional DL power in the PDSCH $$\phi(s_m, g_m) \equiv \frac{1}{R_m} \times \frac{\partial R_m}{\partial s_m}. \tag{8}$$

where Φ ($s_m$, $g_m$) denotes the relative throughput-increment of a subcarrier (or the normalized increment of service rate contributed by the increment of power). However it was found more efficient to use the total power $P_{total}$ instead of Φ to identify the next UE.

This approach is also simpler. The following algorithm is used. First, an MCS vector is initialized the above algorithm is used to minimize the total power P0 of all UEs to reach the MCS values specified in the MCS vector. Then, iteratively, values in the MCS vector are increased (to yield MSC vec1) and the total power P1 of all UEs is minimized to reach the new MCS values specified in the MCS vector 1. The total throughput rates R1 and R0 corresponding to MCSvec and MCSvec1 are computed, and the UE is found, for which the ratio $De1_u=(P1-P0)/((R1-R0)P0)$ is minimal. For this UE, the corresponding value in the MCS vector is incremented.

With the Proportional Fair Power Allocation algorithm the system follows the transition of the UEs by reducing the UL transmit power. In general the Proportional Fair Power Allocation algorithm provides for more efficient use of transmit power comparatively to the optimization without PF, up to 2 dB. If the PF algorithm is applied, the gain, comparatively to the prior art "DAS" reference (which has no PF), varies from 4 dB to 8.5 dB.

For both high end and low end of the throughput there is no significant difference between the results of the regular algorithm and the Proportional Fair Power Allocation algorithm. This is natural as the Proportional Fair Power Allocation algorithm starts from equal MCS values all equal to the minimum possible under the standard and proceeds to the point where many UEs operate at highest possible MCS levels.

Method 200 may further comprise minimizing the total uplink (UL) power (stage 242) by estimating of UL path losses between every UE 70 and every RU 90 (stage 244), based on standard measurement reports from UEs 70, identifying (using an optimization algorithm) the gain factor target values for UL transmit power and gain coefficients per RU 90 (stage 246) and using standard TPC tools to bring the transmit power of every UE 70 to the gain factor target value (stage 248).

The UL Path Loss measurement comprises the eNB switching the UL measurement path to a particular RU 90, triggering certain transmission by the UE and performing measurements of the energy $P_{Rx}$ of the received signal. Based on regular measurements reports (RSRP, RSRQ), the eNB computes the energy $P_{Tx}$ of the UE's transmission $P_{PUSCH,c}(i)$ as specified in the standard and then computes the UL path loss as $P_{TX}/P_{RX}$.

The optimization algorithm receives UL Path Loss values $PL_{a,u}$ between $RU_a$ and $UE_u$ and generates Nominal EPRE of the PUSCH transmission by the $UE_u$ denoted $E_u$ (which is set by the UL TPC) and UL gain $g_a$ for the $RU_a$.

The following notation is used to describe the algorithm:
Index u is used for numbering of UEs, 1≤u≤L.
Indices L+1≤u≤L+K denote (the most remote from RUs) reference points where conditions of PRACH/msg3 availability must be met.

Input:
BW—channel width, in units of REs i.e. in units of subcarriers.
I and N—EPRE of other-cells interference and noise at the location of RUs; assumed constant over time. Includes also interference margin and slow fading margin. $N_a$ denotes the value of I+N at the location of $RU_a$ (1≤a≤M).
$MCS_u$—(constant), the MCS of the PUSCH transmissions from the $UE_u$.
MCS1 denotes the lowest possible MCS in the LTE standard.

$γ(MCS_u)$—minimal SINR that provides for the MCS with required BER in PUSCH transmissions from the $UE_u$.
$γ_{RACH}$ is the minimum SINR required for proper detection of the RACH preambles.
$m_{RACH}$ denotes the total share of the UL resources allocated to the PRACH.
$m_u$ denotes the share of PUSCH resources allocated to the $UE_u$ for data transmissions. It means that for a time interval T, within the time-frequency domain T×BW, the amount of resources allocated to the $UE_u$ is equal to $m_u·T·BW$.
$m_0$ denotes the total share of the UL resources allocated to the msg3 transmissions.
$b_u$ (1≤u≤L) denotes the part of the channel width allocated to the $UE_u$ during a single transmission. For example, if the eNB allocates ⅓ of the total bandwidth to certain $UE_u$ in 1 subframe out of 10 consequent subframes, then $b_u=⅓$ and $m_u=1/30$.
For L+1≤u≤L+K $b_u$ denotes the part of the channel width allocated to the UE for the msg3 transmission within the random access procedure (does not depend on u).
$E_{max}$—maximum allowed transmit power at the UE.

Output:
$E_u$—EPRE of PUSCH transmissions from $UE_u$ (1≤u≤L). For L+1≤u≤L+K, the $E_u$ denotes the EPRE of the msg3 transmission.
$E_{RACH}$=total energy of PRACH transmission.
$g_a$—the UL gain value of the RUa, 1≤a≤M; normalized as $Σ_a g_a=1$.

The SINR at the antenna port of access unit 80 must be at least $γ(MCS_u)$.

$$\sum_a g_a \cdot \frac{\frac{E_u}{PL_{a,u}}}{\sum_a (g_a \cdot IN_a)} \geq γ(MCS_u)$$

Assuming that I+N is constant over the area and $Σ_a g_a=1$, it is equivalent to $$\sum_a g_a \cdot \frac{E_u}{(I+N)PL_{a,u}} \geq γ(MCS_u) \qquad (1)$$

Similarly to (1), the following conditions reflect requirements for the PRACH to be operational in the whole covered region.

$$\sum_a g_a \cdot \frac{E_{RACH}}{(I+N)PL_{a,u}} \geq γ_{RACH} \quad (L+1 \leq u \leq L+K) \qquad (2)$$

Where $E_{RACH}$=EPRE of the PRACH transmissions. The value of $E_{RACH}$ is controlled by the eNB through SIB2 ramp up parameters.

The Random Access procedure includes also transmission of a message (so called msg3) from the UE to the eNB. The power of this transmission should be sufficient for data transfer at least at MCS1. Then for L+1≤u≤L+K we get a condition identical to (1) where for the reference points (indices L+1≤u≤L+K) the "required MCS" is assumed to be equal to MCS1. Therefore $$\sum_a g_a \cdot \frac{E_u}{(I+N)PL_{a,u}} \geq \gamma(MCS_u) \ (1 \leq u \leq L+K) \quad (3)$$

Restriction of the maximum power at the UE $$b_u \cdot E_u \cdot BW \leq E_{max} \ (1 \leq u \leq L+K); \ E_{RACH} \leq E_{max} \quad (4)$$

The cost function: the average total energy of the UL transmissions in the COMPAS $$P_{total} = \beta \cdot E_{max} \cdot m_{RACH} + BW \cdot m_0 \cdot \max_{L+1 \leq u \leq L+K} E_u + BW \cdot \sum_{u=1}^{L} E_u \cdot m_u \to \min$$

Inequalities (2), (3) can be resolved as $$E_u \geq E_u^0(g) \stackrel{def}{=} \frac{\gamma(MCS_u)}{\sum_a \frac{g_a}{(I+N) \cdot PL_{a,u}}} \ (1 \leq u \leq L+K) \quad (5)$$

$$E_{RACH} \geq E_{RACH}^0(g) \stackrel{def}{=} \frac{\gamma_{RACH}}{\min_{L+1 \leq u \leq L+K} \sum_a \frac{g_a}{(I+N)PL_{a,u}}} \quad (6)$$

Inequality (4) can be transformed into the following:

$$E_u \leq F_u \stackrel{def}{=} \frac{E_{max}}{b_u \cdot BW} \ (1 \leq u \leq L+K); \ E_{RACH} \leq E_{max} \quad (7)$$

(5)-(7) imply the following feasibility conditions:

$$E_u^0(g) \leq F_u(1 \leq u \leq L+K); \ E_{RACH}(g) \leq E_{max}$$

or $$F_u \cdot \sum_a \frac{g_a}{(I+N) \cdot PL_{a,u}} \geq \gamma(MCS_u)(1 \leq u \leq L+K) \quad (8)$$

$$E_{max} \cdot \sum_a \frac{g_a}{(I+N) \cdot PL_{a,u}} \geq \gamma_{RACH} \ (L+1 \leq u \leq L+K) \quad (9)$$

If for certain choice of $\{g_a\}$ one of conditions (8) and (9) is not true, there is no solution.

If both (8) and (9) are true then the point of minimum for the $P_{total}$ will be $$E_u = E_u^0(g), \ E_{RACH} = E_{RACH}^0(g)$$

and therefore the minimal value will be $$\Phi(g) = \quad (10)$$

$$E_{RACH}^0(g) \cdot m_{RACH} + BW \cdot m_0 \cdot \max_{L+1 \leq u \leq L+K} E_u^0(g) + BW \cdot \sum_{u=1}^{L} E_u^0(g) \cdot m_u$$

Finally the problem is reduced to minimization of the non-linear function $\Phi(g)$ with linear inequality conditions (8) and (9) and a linear equality condition $$\sum_a g_a = 1 \quad (11)$$

In general form the conditions (8) and (9) can be written as $$\sum_{a=1}^{A} A_{n,a} g_a \leq B_m \ (1 \leq n \leq L+2K)$$

where $$A_{n,a} = \begin{cases} -\frac{F_n}{(I+N) \cdot PL_{a,n}}, & 1 \leq n \leq L+K \\ -\frac{E_{max}}{(I+N) \cdot PL_{a,n-K}}, & L+K+1 \leq n \leq L+2K \end{cases}$$

$$B_n = \begin{cases} -\gamma(MCS_n), & 1 \leq n \leq L+K \\ -\gamma_{RACH}, & L+K+1 \leq n \leq L+2K. \end{cases}$$

The condition (11) can be written as $$\sum_{a=1}^{A} AEQ_{m,a} g_a = BEQ_m \ (m=1)$$

where all $AEQ_{m,a}=1$
Particular solution $g_a$ can be validated by checking the following $$\Delta_u \stackrel{def}{=} \sum_a g_a \cdot \frac{E_u^0(g)}{(I+N)PL_{a,u}} - \gamma(MCS_u) \geq 0 \ (1 \leq u \leq L+K)$$

$$\mu_u \stackrel{def}{=} \sum_a g_a \cdot \frac{E_{RACH}^0(g)}{(I+N)PL_{a,u}} - \gamma_{RACH} \geq 0 \ (L+1 \leq u \leq L+K).$$

At least one of the stages 210-265 of method 200 may be carried out by at least one computer processor.

In the above description, an embodiment is an example or implementation of the invention. The various appearances of "one embodiment", "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Embodiments of the invention may include features from different embodiments disclosed above, and embodiments may incorporate elements from other embodiments disclosed above. The disclosure of elements of the invention in the context of a specific embodiment is not to be taken as limiting their used in the specific embodiment alone.

Furthermore, it is to be understood that the invention can be carried out or practiced in various ways and that the invention can be implemented in embodiments other than the ones outlined in the description above.

The invention is not limited to those diagrams or to the corresponding descriptions. For example, flow need not move through each illustrated box or state, or in exactly the same order as illustrated and described.

Meanings of technical and scientific terms used herein are to be commonly understood as by one of ordinary skill in the art to which the invention belongs, unless otherwise defined.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

What is claimed is:

1. A method of optimizing communication between an access unit and a plurality of user communication devices via a plurality of remote radio units, the method comprising:
   defining a cost function as a momentary overall radiated energy, wherein the cost function is expressed in terms of gain factors of the access unit and the remote radio units, air channel parameters and physical channel energy;
   estimating the air channel parameters;
   setting constraints on the cost function with respect to coverage and maintenance of communication with the users, wherein the coverage constraint is defined using at least one common channel in the access unit and the communication maintenance constraint is defined using user communication device parameters;
   minimizing the cost function under the constraints, for at least one of: downlink communication in respect to the access unit and uplink communication in respect to the user communication devices;
   calculating gain factors and implementing them in the access unit and the remote radio units according to the minimization of the cost function and the constraints; and
   reiterating the calculation and the implementation continuously,
   wherein at least one of the defining, the estimating, the setting, the minimizing, the calculating and the reiterating is carried out by at least one computer processor.

2. The method of claim 1, wherein the estimating air channel parameters is carried out using at least one of: uplink communications, downlink communications and user equipment messages.

3. The method of claim 1, wherein the air channel parameters comprise at least one of: path losses and interference noise.

4. The method of claim 1, wherein the estimation of air channel parameters comprises extrapolating, in the frequency space, downlink channel parameters from uplink channel parameters.

5. The method of claim 1, wherein the estimation of channel parameters comprises utilizing transmission power control (TPC) messages from the user communication devices to calculate directly path losses as the downlink channel parameters.

6. The method of claim 1, further comprising minimizing a total uplink (UL) power by estimating UL path losses between every user communication device and every remote radio unit, and identifying gain factor target values for UL transmit power and gain coefficients per remote radio units to bring the transmit power of every user communication device to the identified gain factor target value.

7. The method of claim 1, further comprising allocating at least one of: remote radio unit downlink power and user mobile communication device uplink power, according to spatial movements of user communication devices with respect to remote radio units, with respect to modulation and coding scheme (MCS) values of the user communication devices.

8. A communication system comprising:
   an access unit comprising at least one common channel having a common channel gain factor, and a plurality of user channels, each associated with a user communication device and having a user channel gain factor;
   a plurality of remote radio units (RUs), each having a RU gain factor; and
   at least one controller arranged to receive communication related data and adjust the common channel, user channel and RU gain factors,
   wherein the access unit is arranged to communicate with the user communication devices via the remote radio units, and
   wherein the at least one controller is configured to:
   define a cost function as a momentary overall radiated energy, wherein the cost function is expressed in terms of gain factors of the access unit and the remote radio units, air channel parameters and physical channel energy;
   estimate the air channel parameters;
   set constraints on the cost function with respect to coverage and maintenance of communication with the users, wherein the coverage constraint is defined using the at least one common channel in the access unit and the communication maintenance constraint is defined using user communication device parameters;
   minimize the cost function under the constraints, for at least one of: downlink communication in respect to the access unit, and uplink communication in respect to the user communication devices;
   calculate gain factors and implementing them in the access unit and the remote radio units according to the minimization of the cost function and the constraints; and
   reiterate the calculation and the implementation continuously.

9. The communication system of claim 8, wherein the air channel parameters comprise at least one of: path losses and interference noise.

10. The communication system of claim 8, wherein the estimation of air channel parameters comprises extrapolating, in the frequency space, downlink channel parameters from uplink channel parameters.

11. The communication system of claim 8, wherein the estimation of air channel parameters comprises utilizing transmission power control (TPC) messages from the user communication devices to calculate directly the downlink channel parameters.

12. The communication system of claim 8, wherein the at least one controller is further configured to minimize a total uplink (UL) power by estimating UL path losses between every user communication device and every remote radio unit and to identify gain factor target values for UL transmit power and gain coefficients per remote radio units to bring the transmit power of every user communication device to the identified gain factor target value.

13. The communication system of claim 8, wherein the at least one controller is further configured to allocate at least one of: remote radio unit downlink power and user mobile communication device uplink power, according to spatial movements of user communication devices with respect to remote radio units, with respect to modulation and coding scheme (MCS) values of the user communication devices.

* * * * *